US007167682B1

(12) United States Patent
Madsen et al.

(10) Patent No.: US 7,167,682 B1
(45) Date of Patent: Jan. 23, 2007

(54) RADIO FREQUENCY (RF) TRANSCEIVER WITH SUBSTANTIALLY COINCIDENT COMMUNICATION OF RF AND RELATED CONTROL SIGNALS

(75) Inventors: Benny Madsen, Los Altos, CA (US); Christian Olgaard, Sunnyvale, CA (US); Carsten Andersen, Sunnyvale, CA (US); Gary Wang, Milpitas, CA (US); Thomas Andersen, Pleasanton, CA (US); Peter Petersen, Concord, CA (US)

(73) Assignee: LitePoint Corporation, Sunnyvale, CA (US)

( * ) Notice: Subject to any disclaimer, the term of this patent is extended or adjusted under 35 U.S.C. 154(b) by 405 days.

(21) Appl. No.: 10/770,030

(22) Filed: Feb. 2, 2004

(51) Int. Cl.
*H04B 17/00* (2006.01)

(52) U.S. Cl. .................. 455/67.11; 455/67.11; 455/67.14; 455/115.1

(58) Field of Classification Search ............... 455/423, 455/425, 67.13–67.7, 115.1–115.4, 226.1–226.4, 455/67.11
See application file for complete search history.

(56) References Cited

U.S. PATENT DOCUMENTS

| 5,701,600 | A | * | 12/1997 | Wetters et al. | ............... | 455/208 |
| 5,793,800 | A | * | 8/1998 | Jylha et al. | .................. | 375/219 |
| 5,835,850 | A | * | 11/1998 | Kumar | .................... | 455/67.14 |
| 5,881,376 | A | * | 3/1999 | Lundberg et al. | ........ | 455/226.1 |
| 5,898,905 | A | * | 4/1999 | Aldridge et al. | .......... | 455/67.14 |
| 5,995,541 | A | * | 11/1999 | Navid et al. | ................. | 375/224 |
| 6,795,693 | B1 | * | 9/2004 | Balech | ..................... | 455/115.1 |
| 6,882,827 | B1 | * | 4/2005 | Collier | .................... | 455/67.11 |
| 2002/0090915 | A1 | * | 7/2002 | Komara et al. | ............... | 455/69 |
| 2005/0090209 | A1 | * | 4/2005 | Behzad | ..................... | 455/115.1 |
| 2005/0107059 | A1 | * | 5/2005 | Lehning et al. | ............. | 455/303 |
| 2005/0148304 | A1 | * | 7/2005 | Jerng | .......................... | 455/75 |
| 2005/0164648 | A1 | * | 7/2005 | Gannholm | .................... | 455/84 |

* cited by examiner

*Primary Examiner*—Simon Nguyen
(74) *Attorney, Agent, or Firm*—Vedder, Price, Kaufman & Kammholz, P.C.

(57) ABSTRACT

A radio frequency (RF) transceiver for providing substantially coincident communication of RF and related baseband control signals. Baseband circuitry within the transmitter and receiver sections provides for storage of related control data which can be used in real time to control processing of the transmitted or received data, respectively.

20 Claims, 5 Drawing Sheets

RADIO FREQUENCY (RF) TRANSCEIVER WITH SUBSTANTIALLY COINCIDENT COMMUNICATION OF RF AND RELATED CONTROL SIGNALS

BACKGROUND OF THE INVENTION

1. Field of the Invention

The present invention relates to radio frequency (RF) transceivers, and in particular, to dedicated test equipment for testing RF transceivers.

2. Description of the Related Art

Wireless communication devices are becoming increasingly prevalent in the daily lives of many people. With many applications already in existence, and increasing numbers of applications already planned, the designs for these wireless devices have been moving from being driven by technology to becoming commodities where cost become the critical feature. Accordingly, the integration level of the integrated circuits, or chip sets, used for these devices has increased, thereby lowering many costs, particularly at the system level. As a result of this, production testing and adjusting of these devices is now becoming a larger factor in terms of unit costs. Accordingly, lower costs for performing these tests is becoming increasingly critical.

SUMMARY OF THE INVENTION

In accordance with the presently claimed invention, a radio frequency (RF) transceiver provides for substantially coincident communication of RF and related baseband control signals. Baseband circuitry within the transmitter and receiver sections provides for storage of related control data which can be used in real time to control processing of the transmitted or received data, respectively.

In accordance with one embodiment of the presently claimed invention, a radio frequency (RF) transceiver for providing substantially coincident communication of RF and related baseband control signals includes an at least partial enclosure substantially defining a volume, a plurality of interface terminals, transmitter baseband signal and control circuitry, RF transmitter circuitry, RF receiver circuitry and receiver baseband signal and control circuitry. The interface terminals are substantially contained within the volume and include: a plurality of RF terminals to convey one or more RF output signals and to convey one or more RF input signals; and a plurality of control terminals to convey one or more outgoing control signals and to convey one or more incoming control signals. The transmitter baseband signal and control circuitry is substantially contained within the volume, coupled to at least one of the plurality of control terminals and responsive to a plurality of transmission data and a plurality of outgoing control data by providing one or more transmitter baseband signals and the one or more outgoing control signals, respectively, wherein at least a portion of the plurality of outgoing control data is related to at least a portion of the plurality of transmission data. The RF transmitter circuitry is substantially contained within the volume, coupled to the transmitter baseband signal and control circuitry and at least one of the plurality of RF terminals, and responsive to at least one of the one or more transmitter baseband signals by providing at least one of the one or more RF output signals, wherein the at least one of the one or more RF output signals corresponds to the at least one of the one or more transmitter baseband signals. The RF receiver circuitry is substantially contained within the volume, coupled to at least one of the plurality of RF terminals and responsive to at least one of the one or more RF input signals by providing one or more receiver baseband signals. The receiver baseband signal and control circuitry is substantially contained within the volume, coupled to the RF receiver circuitry and at least one of the plurality of control terminals, and responsive to at least one of the one or more receiver baseband signals and at least one of the one or more incoming control signals by providing a plurality of reception data and a plurality of incoming control data, wherein at least a portion of the plurality of incoming control data is related to at least a portion of the plurality of reception data.

In accordance with another embodiment of the presently claimed invention, a radio frequency (RF) transceiver for providing substantially coincident communication of RF and related baseband control signals includes an at least partial enclosure substantially defining a volume, a plurality of interface terminals, storage circuitry and signal conversion circuitry. The interface terminals are substantially contained within the volume and include: a plurality of RF terminals to convey one or more RF output signals and to convey one or more RF input signals; and a plurality of control terminals to convey one or more outgoing control signals and to convey one or more incoming control signals. First storage circuitry is substantially contained within the volume and responsive to a plurality of transmission data by storing the plurality of transmission data and providing one or more transmitter baseband signals. Second storage circuitry is substantially contained within the volume, coupled to at least one of the plurality of control terminals and responsive to a plurality of outgoing control data by storing the plurality of outgoing control data and providing the one or more outgoing control signals, wherein at least a portion of the outgoing control data is related to at least a portion of the plurality of transmission data. First signal conversion circuitry is substantially contained within the volume, coupled to the first storage circuitry and responsive to at least one of the one or more transmitter baseband signals by providing a corresponding one or more outgoing analog baseband signals. Second signal conversion circuitry is substantially contained within the volume, coupled to the first signal conversion circuitry and at least one of the plurality of RF terminals, and responsive to at least one of the one or more outgoing analog baseband signals by providing the at least one of the one or more RF output signals, wherein the at least one of the one or more RF output signals corresponds to the at least one of the one or more transmitter baseband signals. Third signal conversion circuitry is substantially contained within the volume, coupled to at least one of the plurality of RF terminals and responsive to at least one of the one or more RF input signals by providing a corresponding one or more incoming analog baseband signals. Fourth signal conversion circuitry is substantially contained within the volume, coupled to the third signal conversion circuitry and responsive to at least one of the one or more incoming analog baseband signals by providing one or more receiver baseband signals. Third storage circuitry is substantially contained within the volume, coupled to the fourth signal conversion circuitry and responsive to at least one of the one or more receiver baseband signals by storing a plurality of reception data. Fourth storage circuitry is substantially contained within the volume, coupled to at least one of the plurality of control terminals, and responsive to the at least one of the one or more incoming control signals by storing a plurality of incoming control data, wherein at least a portion of the plurality of incoming control data is related to at least a portion of the plurality of reception data.

In accordance with another embodiment of the presently claimed invention, a radio frequency (RF) transceiver for providing substantially coincident communication of RF and related baseband control signals includes enclosure means for substantially defining a volume, interface means, transmitter baseband signal and control means, RF transmitter means, RF receiver means and receiver baseband signal and control means. The interface means, substantially contained within the volume, is for conveying one or more RF output signals, one or more RF input signals, one or more outgoing control signals and one or more incoming control signals. The transmitter baseband signal and control means, substantially contained within the volume, is for responding to a plurality of transmission data and a plurality of outgoing control data by generating one or more transmitter baseband signals and the one or more outgoing control signals, wherein at least a portion of the outgoing control data is related to at least a portion of the plurality of transmission data. The RF transmitter means, substantially contained within the volume, is for responding to at least one of the one or more transmitter baseband signals by generating at least one of the one or more RF output signals, wherein the at least one of the one or more RF output signals corresponds to the at least one of the one or more transmitter baseband signals. The RF receiver means, substantially contained within the volume, is for responding to at least one of the one or more RF input signals by generating one or more receiver baseband signals. The receiver baseband signal and control means, substantially contained within the volume, is for responding to at least one of the one or more receiver baseband signals and at least one of the one or more incoming control signals by generating a plurality of reception data and a plurality of incoming control data, wherein at least a portion of the incoming control data is related to at least a portion of the plurality of reception data.

In accordance with still another embodiment of the presently claimed invention, a radio frequency (RF) transceiver for providing substantially coincident communication of RF and related baseband control signals includes enclosure means for substantially defining a volume, interface means, storage means and signal converter means. The interface means, substantially contained within the volume, is for conveying one or more RF output signals, one or more RF input signals, one or more outgoing control signals and one or more incoming control signals. First storage means, substantially contained within the volume, is for responding to a plurality of transmission data by storing the plurality of transmission data and generating one or more transmitter baseband signals. Second storage means, substantially contained within the volume, is for responding to a plurality of outgoing control data by storing the plurality of outgoing control data and generating the one or more outgoing control signals, wherein at least a portion of the outgoing control data is related to at least a portion of the plurality of transmission data. First signal converter means, substantially contained within the volume, is for responding to at least one of the one or more transmitter baseband signals by generating a corresponding one or more outgoing analog baseband signals. Second signal converter means, substantially contained within the volume, is for responding to at least one of the one or more outgoing analog baseband signals by generating the at least one of the one or more RF output signals, wherein the at least one of the one or more RF output signals corresponds to the at least one of the one or more transmitter baseband signals. Third signal converter means, substantially contained within the volume, is for responding to at least one of the one or more RF input signals by generating a corresponding one or more incoming analog baseband signals. Fourth signal converter means, substantially contained within the volume, is for responding to at least one of the one or more incoming analog baseband signals by generating one or more receiver baseband signals. Third storage means, substantially contained within the volume, is for responding to at least one of the one or more receiver baseband signals by storing a plurality of reception data. Fourth storage means, substantially contained within the volume, is for responding to the at least one of the one or more incoming control signals by storing a plurality of incoming control data, wherein at least a portion of the plurality of incoming control data is related to at least a portion of the plurality of reception data.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of selected parts of such circuitry may alternatively be implemented using one or more appropriately programmed processors, depending upon the signal frequencies or data rates to be processed.

As will be discussed in more detail below, the present invention enables the implementation of a fully integrated RF tester capable of testing both transmit and receive functions. Such tester includes the ability to test RF functionality of the transceiver separate from the remaining system (e.g., baseband function) in terms of both transmit and receive functions, thereby facilitating production testing and adjustment of the RF transceiver functions.

An integrated transceiver in accordance with the following discussion has been implemented for purposes of testing RF transceivers intended for use according to the IEEE 802.11 standard, using the frequencies of 2.4–2.485 gigahertz and 4.9–5.85 gigahertz. However, it will be understood by one of ordinary skill in the art that transceivers in accordance with the presently claimed invention can be implemented for use over other frequency ranges.

Dedicated test equipment in which both transmit and receive test functionality is integrated within a single unit or enclosure enables sharing of common resources, such as power supplies and RF oscillators or synthesizers. When integrating transmit and receive functionality together, precautions must be taken to avoid crosstalk between the receiver and transmitter, particularly since test equipment requires significantly better performance than the device under test (DUT), and even minimal interaction between the transmit and receive signal paths will have significant negative effects. Accordingly, it is important to properly plan the use of the various signal frequencies within the system so as to minimize interference within the tester.

When testing RF transceivers, it is important that any frequency synthesizers being used within the test equipment are fully settled in frequency and phase so as to avoid undesired frequency or phase variations during test measurements. In conventional testing systems, transmit and receive functions are separated, e.g., in separate enclosures, thereby allowing one frequency synthesizer to be reprogrammed while another synthesizer unit is being used for testing. However, if multiple frequency synthesizers are used in a single enclosure, the frequency of the synthesizer currently in use for testing may be pulled in frequency by the settling of the other frequency synthesizer being reprogrammed. Accordingly, additional time would be needed to allow settling of the synthesizers to prevent such frequency pulling, thereby increasing the time needed for dedicated synthesizer reprogramming.

However, if synthesizers are shared between both transmit and receive functions, such frequency pulling and additional reprogramming time can be avoided, since the system will always be settled correctly with the transmit and receive signal paths using the same synthesizer frequency. This can be particularly advantageous in the case of multiple testers being used, where the use of a shared synthesizer allows simpler frequency plans to be implemented (e.g., simple frequency separation), thereby minimizing interferences introduced between testers.

Another desirable characteristic or function is the ability to test the RF functionality of a device separate from other functions, such as baseband. Access to testing of the RF performance alone would enable the tester to determine any necessary compensation required elsewhere, such as within the baseband function, to offset any RF functional impairments. Accordingly, the tester would need the ability to provide corresponding baseband and RF signals.

Figure 1A:
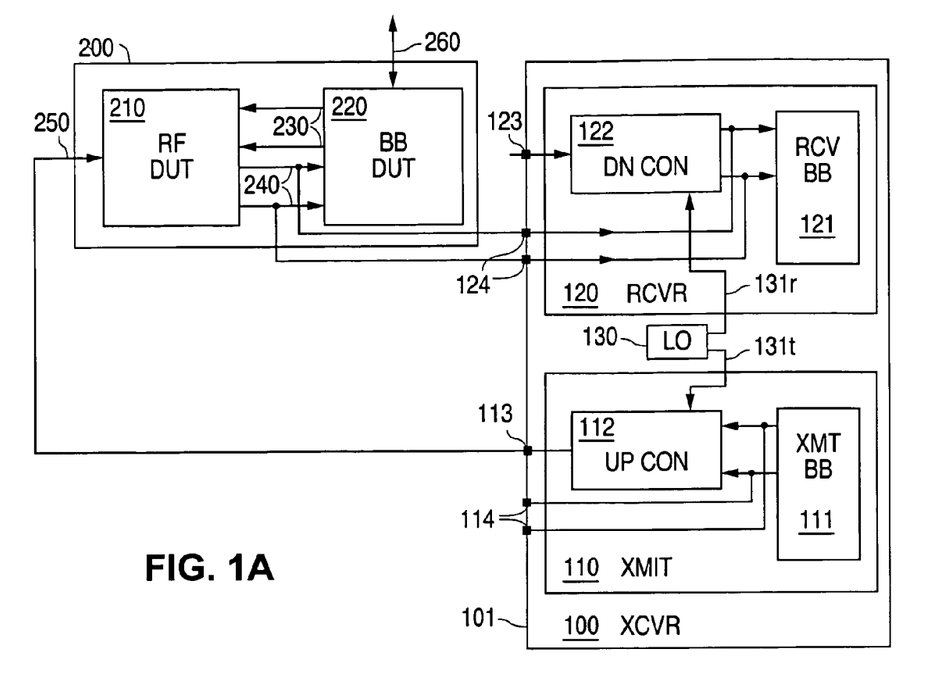
FIG. 1 is a functional block diagram of an integrated RF transceiver for use in testing RF transceivers in a production environment in accordance with one embodiment of the presently claimed invention.
Figure 1B:
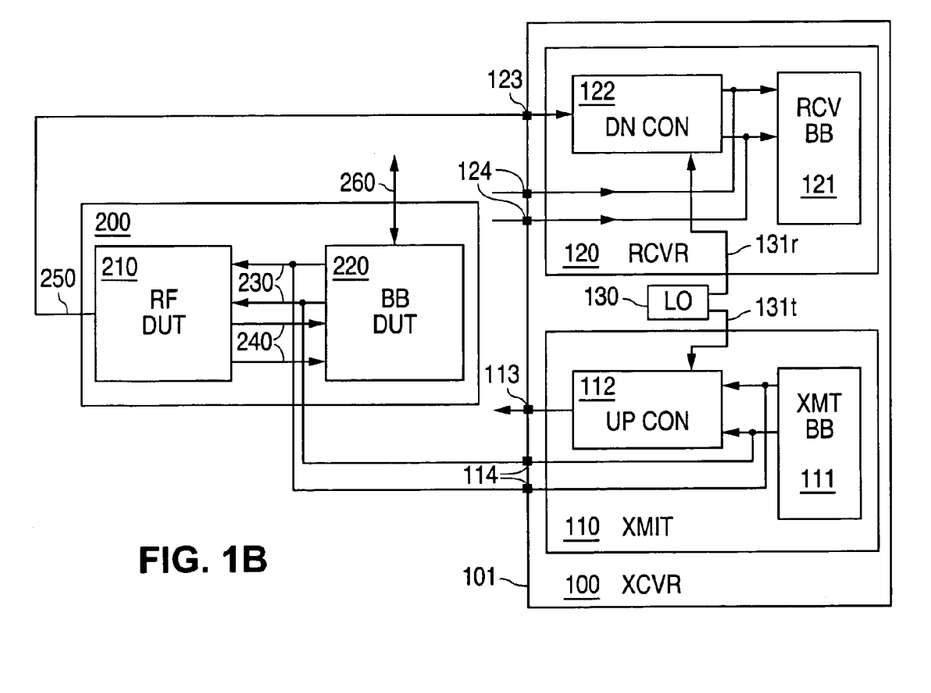

Referring to FIG. 1, in accordance with one embodiment of the presently claimed invention, an integrated RF tester in the form of a RF transceiver 100 is implemented in a single volume 101 defined by an at least partial enclosure (e.g., shielded box, rack assembly, etc.) in which full transmit 110 and receive 120 functions are included using a shared local oscillator (LO) 130 (e.g., frequency synthesizer) for testing a system DUT 200. The transmitter 110 includes baseband circuitry 111 and frequency up conversion circuitry 112. The baseband circuitry 111 provides baseband signals in the form of quadrature signals (I,Q) to the frequency up conversion circuitry 112, as well as to baseband signal terminals 114 for use by the system DUT 200. The frequency up conversion circuitry 112 provides an RF signal (e.g., quadrature modulated) to an RF output terminal 113 for use by the system DUT 200.

The receiver 120 includes frequency down conversion circuitry 122 and baseband circuitry 121. The frequency down conversion circuitry 122 receives an RF input signal via an RF input signal terminal 123, and provides quadrature baseband signals (I,Q) to the baseband circuitry 121 for baseband signal processing. The baseband circuitry 121 can also receive baseband input signals via baseband input terminals 124 directly from the system DUT 200.

A common LO 130 provides RF signals 131$r$, 131$t$ for use by the frequency down conversion circuitry 122 and frequency up conversion circuitry 112.

The system DUT 200 generally includes a RF section 210 and a baseband section 220. The RF section 210 provides frequency up conversion for the outgoing signal and frequency down conversion for the incoming signal, with both conveyed via a RF signal terminal 250.

The baseband section 220 provides the transmit baseband signals 230 for frequency up conversion by the RF section 210, and receives receive baseband signals 240 following frequency down conversion by the RF section 210. A communication or control interface 260 allows the baseband section 220 to communicate with external devices or systems (not shown), including a computer for controlling the system DUT 200.

As shown in the upper portion of FIG. 1, the receive function of the RF section 210 of the system DUT 200 is tested by providing the RF output signal of the tester from the RF output terminal 113 to the RF terminal 250 of the system DUT 200, and capturing the receive baseband signals 240 via the baseband input terminals 124. This allows the receive function of the RF section 210 to be tested in isolation from any effects of baseband processing by the baseband section 220, since the baseband section 121 of the tester 100 is used.

Similarly, as shown in the lower portion of FIG. 1, testing of the transmit function of the RF section 210 of the system DUT 200 can be done by providing it with transmit baseband signals from the transmit baseband circuitry 111 of the transmitter 110 within the tester 100 via the baseband output terminals 114. The transmit RF signal of the DUT 200 is provided, via the RF terminal 250, to the frequency down conversion circuitry 122 via the RF input terminal 123 of the receiver 120. (For testing of the full transmitter function of the DUT 200, of course, the baseband signals 230 generated by the DUT baseband section 220 can be used instead of those baseband signals available from the transmit baseband circuitry 111 of the transmitter 110 within the tester 100.)

Based upon the foregoing, it can be seen that having complete transmit and receive functions, including frequency conversion and baseband signal processing, within an integrated tester allows for testing of the receive and transmit functions of an RF system DUT in isolation from effects introduced by other sections, such as baseband signal sources or processors.

Figure 2:
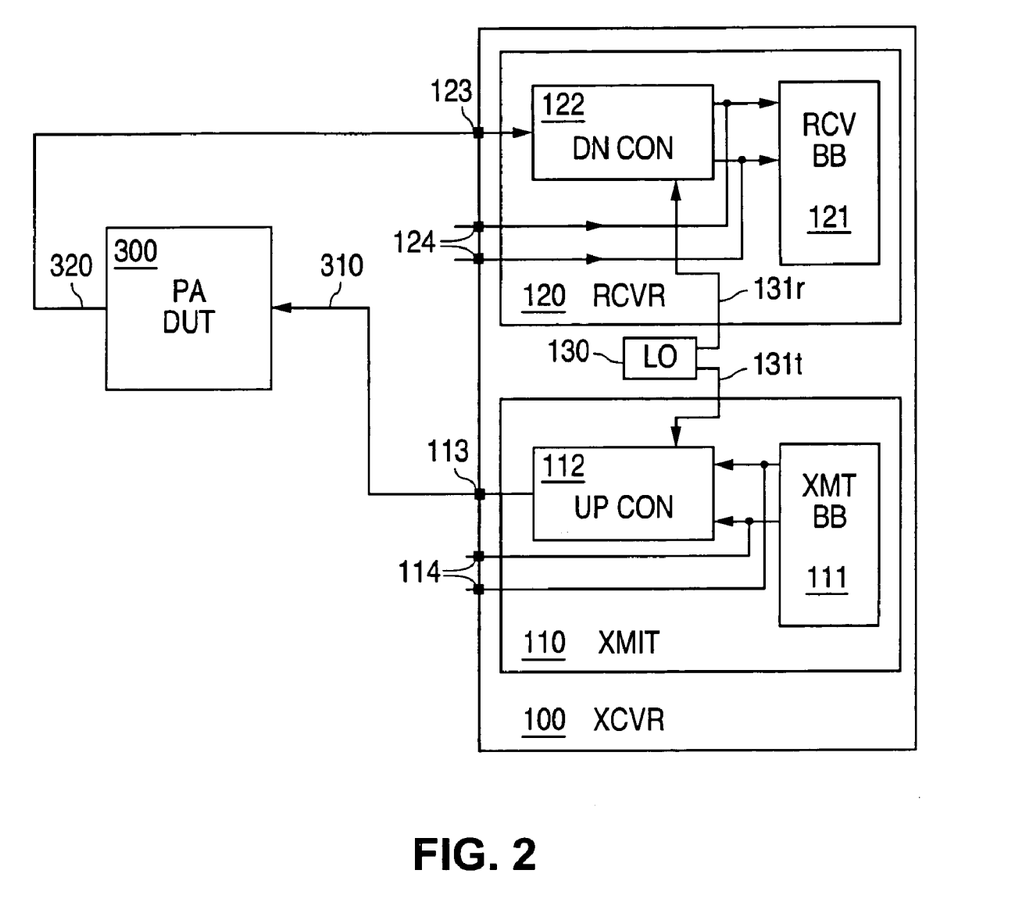
FIG. 2 is a functional block diagram of the RF tester of FIG. 1 when used for testing an amplifier.

Referring to FIG. 2, the integrated tester 100 can also be used advantageously for testing an RF amplifier, such as a power amplifier 300. Such testing requires the use of a known RF input signal applied to the input 310 of the power amplifier DUT 300 for producing an output signal at the output terminal 320. Accordingly, the output signal is provided to the receiver 120 via the RF input terminal 123. Since the DUT 300 is an amplifier, both input and output signals of interest are generally at the same frequency. Hence, the use of a common LO 130 advantageously allows the frequency up conversion circuitry 112 and frequency down conversion circuitry 122 to be driven by equal-frequency LO signals 131t, 131r.

Figure 3:
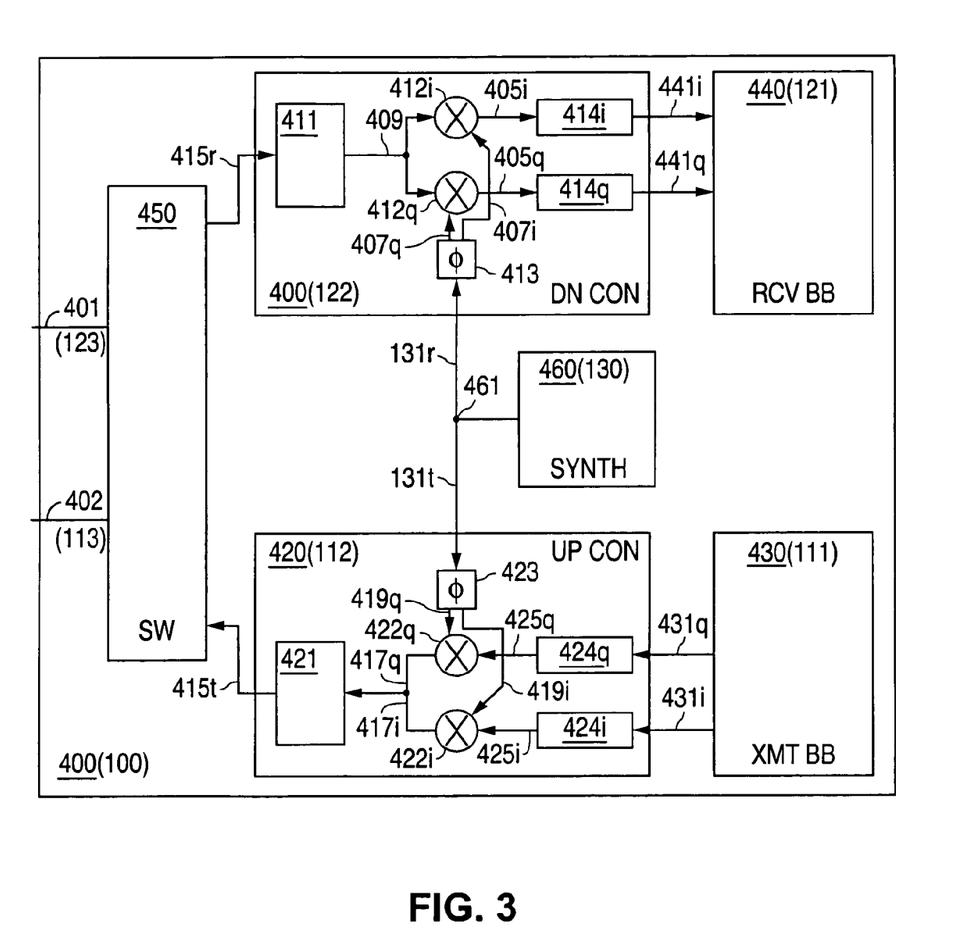
FIG. 3 is a functional block diagram of one example implementation of the RF transceiver of FIG. 1.

Referring to FIG. 3, one example implementation 400 of the tester 100 with a shared LO 130 in the form of a frequency synthesizer 460 uses direct conversion for the frequency up and down conversion functions, thereby avoiding the need for an intermediate frequency (IF) mixing signal or circuitry.

On the transmit side, the transmit baseband circuitry 430 provides the quadrature baseband signals 431i, 431q to the up conversion circuitry 420. These signals 431i, 431q are processed by baseband signal processing stages 424i, 424q (e.g., filters) to provide processed baseband signals 425i, 425q to the mixers 422i, 422q which provide the quadrature modulation using the quadrature signal phases 419i, 419q, as provided by a phase splitter 423, of the transmitter LO signal 131t. The resulting quadrature-modulated signals 417i, 417q are combined (e.g., summed) and provided to an output amplifier 421 which, in turn, provides the output signal 415t to a switch matrix 450. (The switch matrix 450, while not necessary, allows each of the external RF signal ports 401, 402 to be used as an input to the down converter 410 or as an output from the up converter 420.)

On the receive side, the incoming receive RF signal 415r is received by a gain stage 411 which provides any necessary signal gain or attenuation. The resulting signal 409 is then provided to the quadrature signal mixers 412i, 412q which quadrature-demodulates the signal 409 using the quadrature signal phases 407i, 407q, as provided by a phase splitter 413, of the receive LO signal 131r. The resulting quadrature-demodulated signals 405i, 405q are processed by baseband signal processors 414i, 414q (e.g., filters) to provide the baseband signals 441i, 441q for the receive baseband circuitry 440.

While this direct conversion technique has the benefit of simplicity, other techniques can be used to achieve further reductions in leakage of the LO signals 131r, 131t potentially present when using low level transmit signals for testing receiver sensitivity, and pulling of the receiver signal frequency during transmitter testing under strong signal conditions.

Figure 4:
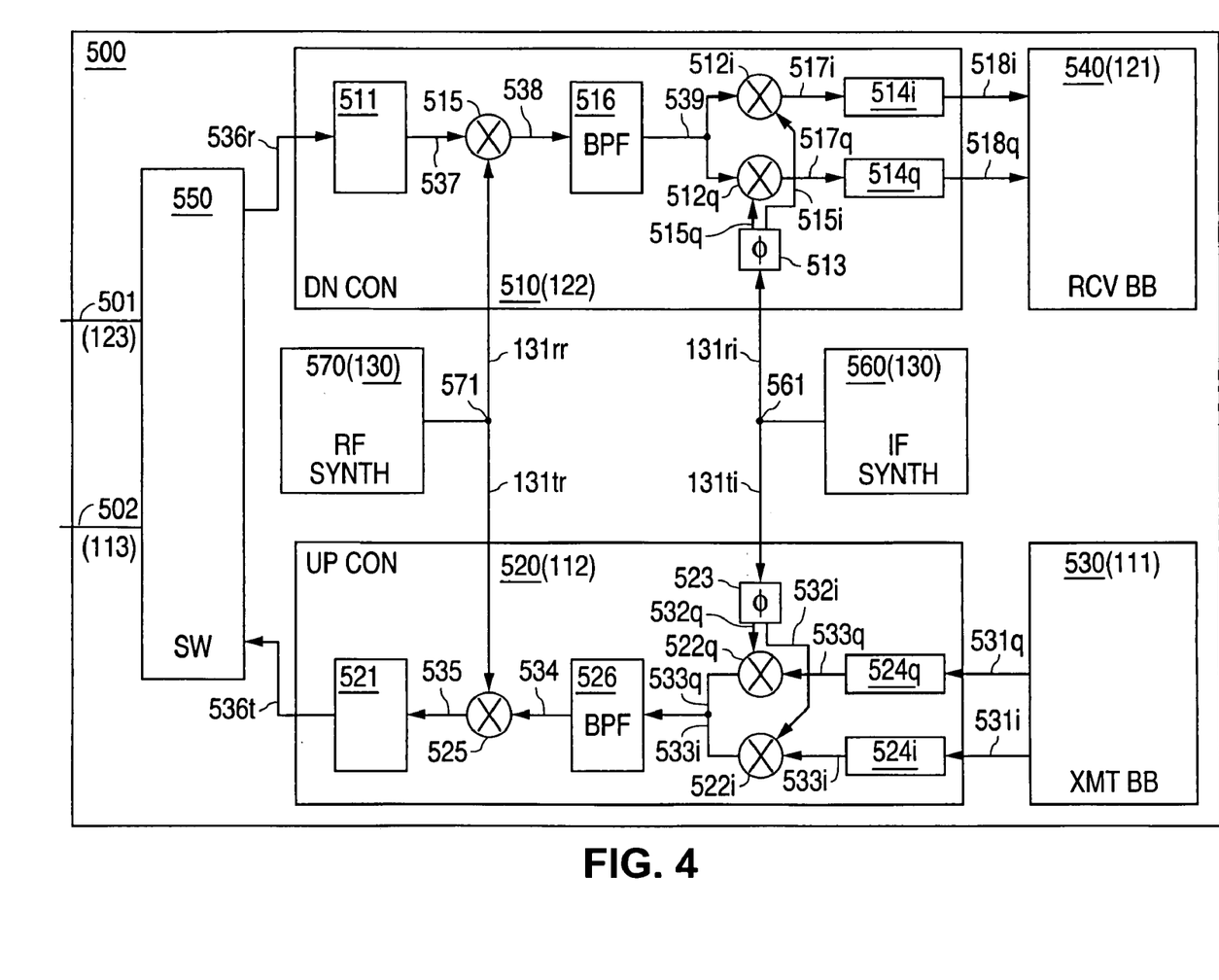
FIG. 4 is a functional block diagram of another example implementation of the RF transceiver of FIG. 1.

Referring to FIG. 4, a preferred approach is to use a super heterodyne architecture for both transmitter and receiver, where the conversion from IF to baseband is done using quadrature baseband representation. By using a sufficiently high IF frequency, a simple wideband filter can filter most if not all undesired spurious signals. Further, such an architecture facilitates the use of common LOs, or synthesizers, thereby allowing a single frequency to be used for multiple testers in a production environment.

Similar to the circuitry of FIG. 3, the transmitter provides a transmit RF signal 536t and the receiver receives a receive RF signal 536r via a switch matrix 550. One common RF synthesizer 570 provides the LO signals 131tr, 131rr for up and down RF signal conversion, while another common synthesizer 560 provides the LO signals 131ti, 131ri for the up and down IF frequency conversion. The transmitter section uses quadrature modulation for conversion of the baseband signals to IF, while the receiver section uses quadrature demodulation for conversion of the IF signal to quadrature baseband signals.

The transmit baseband circuitry 530 provides quadrature baseband signals 531i, 531q to the up converter 520. These signals 531i, 531q are processed (e.g., filtered) by baseband processors 524i, 524q. The resulting processed signals 533i, 533q are quadrature modulated in mixers 522i, 522q driven by the quadrature signal phases 532i, 532q of the IF mixer signal 131ti provided by the phase splitter 523. The resulting quadrature-modulated signals 533i, 533q are combined and provided to a band-pass filter 526. The filtered signal 534 is up-converted in frequency with a mixer 525 driven by the RF mixer signal 131tr. The up-converted signal 535 is amplified by an amplifier 521 to produce the transmit signal 536t.

The incoming RF receive signal 536r is processed by a gain stage 511 which provides any necessary amplification or attenuation. The resulting signal 537 is down-converted in frequency in a mixer 515 driven by the RF mixer signal 131rr. The resulting IF signal 538 is filtered by a bandpass filter 516. The filtered IF signal 539 is quadrature-demodulated in signal mixers 512i, 512q driven by the quadrature signal phases 515i, 515q of the IF mixer signal 131ri as provided by a phase splitter 513. The quadrature-demodulated baseband signals 517i, 517q are processed (e.g., filtered) by baseband processors 514i, 514q. The resulting baseband signals 518i, 518q are provided to the receive baseband circuitry 540.

In modern test equipment part, and often much, of the processing power is handled by a processing station (e.g., personal computer or workstation) remote from the actual test equipment performing the measurements. This allows for a flexible testing environment since various user interfaces can be implemented, plus it facilitates maintaining and updating any necessary software and hardware in the processing station, as well as updating the entire processing station to provide more processing power as needed. However, in a production test environment, such an approach may introduce time delays or other communication issues between the local test equipment and remote processing station, due to the communications needed to set up and control the local test equipment and to transfer any measurement data to the remote processing station for processing.

In many test environments, it is often the case that many of the tests to be performed are very similar with only slight modifications necessary when changing from one test to another. One example of this would be a power sweep of a RF system in which a gain profile is measured and only power levels and frequency end points need modification.

Figure 5:
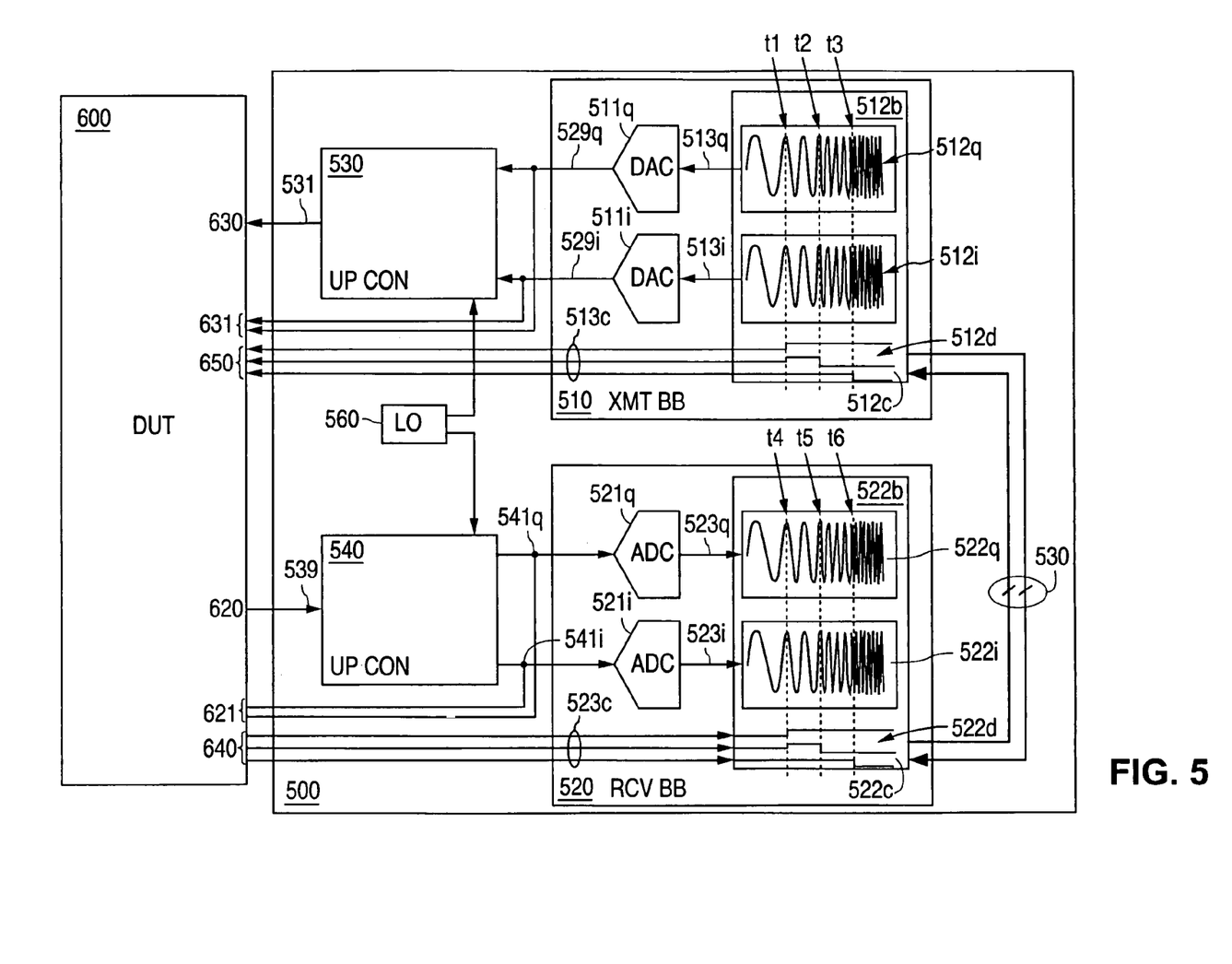
FIG. 5 is a functional block diagram of another example implementation of the RF transceiver of FIG. 1.

Referring to FIG. 5, in accordance with another embodiment of the presently claimed invention, a RF tester 500, including, as before, complete transmit and receive functions, provides substantially coincident communication of RF and related baseband control signals in both transmit and receive signal paths. On the transmit side, such control signals can be used to indicate or signal, to the DUT 600, changes in the tests to be performed or measurements to be taken. Similarly on the receive side, such control signals can be used to control the baseband processor of the receiver or otherwise indicate some change in status of character of the signals or data being received.

Similar to the RF testers discussed above, the transmit side includes baseband circuitry 510 and frequency up conversion circuitry 530. The baseband circuitry 510 includes storage circuitry 512b, 512c for data 512i, 512q corresponding to the test signal waveforms and control data 512d which will be related to the signal waveform data 512i, 512q, digital baseband signals 513i, 513q, analog baseband signals 529*i*, 529*q*, or RF output signal 531, depending upon the role of such control data 512*d*. Digital data signals 513*i*, 513*q* corresponding to the data 512*i*, 512*q* are converted by digital-to-analog converters (DAC) 511*i*, 511*q* to provide the analog baseband signals 529*i*, 529*q* to drive the frequency up conversion circuitry 530. The control signals 513*c* corresponding to the control data 512*d* are provided in predetermined timing relationships with respect to the signals within the transmit path. Such timing relationships may be coincident or a predetermined time leads or lags depending upon the intended uses of the control signals 513*c*. For example, the control signals 513*c* may have a timing relationship with respect to the data signals 513*i*, 513*q* such that the control signals 513*c* have signal transitions corresponding to time intervals t1, t2, t3, where the signal waveforms change in frequency. Other functional or timing relationships between the signal data 512*i*, 512*q* and control data 512*d* will be readily apparent to one of ordinary skill in the art.

On the receive side, the incoming RF signal 539 is received and frequency down converted by the frequency down conversion circuitry 540 to produce analog baseband signals 541*i*, 541*q*. These signals 541*i*, 541*q* are converted to digital signals 523*i*, 523*q* by analog-to-digital converters (ADC) 521*i*, 521*q*. These digital signals 523*i*, 523*q* can be stored in storage circuitry 522*b*. Similarly, incoming control signals 523*c* are received from the DUT 600 and stored in storage circuitry 522*c* within the receiver baseband circuitry 520. As with the transmitter section, these control signals 523*c* correspond to control data 522*d* which can have virtually any desired relationships with respect to the signal data 522*i*, 522*q* corresponding to the incoming digital signals 523*i*, 523*q*. For example, such control data 522*d* can represent signal waveforms having signal transitions at times t4, t5, t6 at which the signals corresponding to the signal data 522*i*, 522*q* experience changes in signal frequency. Again, as with the transmit section, the incoming control signals 523*c* can have virtually any timing relationships with respect to the incoming RF signal 539, incoming analog signals 541*i*, 541*q*, or incoming digital signals 523*i*, 523*q*.

Additionally, the transmit 510 and receive 520 baseband circuitry can be mutually coupled by way of signal busses 530 providing communication between the baseband processors 510, 520, as well as the storage circuits 512*b*, 512*c*, 522*b*, 522*c*. This will allow communications to occur between the receive and transmit sections so that various transmit and receive functions or events can be coordinated or synchronized prior to, during or subsequent to testing of the DUT 600.

As will be readily understood by one of ordinary skill in the art, the baseband signals 431*i*, 431*q*, 531*i*, 531*q* provided by the transmit baseband circuitry 430, 530 to the up conversion circuitry 420, 520 (FIGS. 3 and 4) or baseband output terminals 114 (FIGS. 1 and 2), as well as the baseband signals 441*i*, 441*q*, 518*i*, 518*q* received by the receive baseband circuitry 440, 540 from the down conversion circuitry 410, 510 (FIGS. 3 and 4) or baseband input terminals 124 (FIGS. 1 and 2) need not necessarily be at "baseband" frequencies in the sense that they are at the signal frequencies at which the data signals (I, Q) are initially generated (transmitter) or ultimately processed (receiver). Alternatively, such "baseband" signals 431*i*, 431*q*, 531*i*, 531*q*, 441*i*, 441*q*, 518*i*, 518*q* can be at a lower intermediate frequency (IF), i.e., a frequency which is lower than the frequencies of the various LO signals 131*t*, 131*r*, 131*tr*, 131*rr* (FIGS. 3 and 4) and RF mixer signals 131*ti*, 131*ri* (FIG. 4), but higher than the signal frequencies at which the data signals are initially generated or ultimately processed, thus a frequency shifted version of the equivalent baseband signal. Accordingly, the transmit baseband circuitry 430, 530 and receive baseband circuitry 440, 540 would then include, as necessary, additional frequency translation stages.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a radio frequency (RF) transceiver for providing substantially coincident communication of RF and related baseband control signals, comprising:

an at least partial enclosure substantially defining a volume;

a plurality of interface terminals substantially contained within said volume and including
a plurality of RF terminals to convey one or more RF output signals to one or more destinations external to said volume, and to convey one or more RF input signals from one or more sources external to said volume, and
a plurality of control terminals to convey one or more outgoing control signals to another one or more destinations external to said volume and to convey one or more incoming control signals from another one or more sources external to said volume;

transmitter baseband signal and control circuitry substantially contained within said volume, coupled to at least one of said plurality of control terminals and responsive to a plurality of transmission data and a plurality of outgoing control data by providing one or more transmitter baseband signals and said one or more outgoing control signals, respectively, wherein at least a portion of said plurality of outgoing control data is related to at least a portion of said plurality of transmission data;

RF transmitter circuitry substantially contained within said volume, coupled to said transmitter baseband signal and control circuitry and at least one of said plurality of RF terminals, and responsive to at least one of said one or more transmitter baseband signals by providing at least one of said one or more RF output signals, wherein said at least one of said one or more RF output signals corresponds to said at least one of said one or more transmitter baseband signals;

RF receiver circuitry substantially contained within said volume, coupled to at least one of said plurality of RF terminals and responsive to at least one of said one or more RF input signals by providing one or more receiver baseband signals; and receiver baseband signal and control circuitry substantially contained within said volume, coupled to said RF receiver circuitry and at least one of said plurality of control terminals, and responsive to at least one of said one or more receiver baseband signals and at least one of said one or more incoming control signals by providing a plurality of reception data and a plurality of incoming control data, wherein at least a portion of said plurality of incoming control data is related to at least a portion of said plurality of reception data.

2. The apparatus of claim 1, wherein said transmitter baseband signal and control circuitry comprises:
   first storage circuitry responsive to said plurality of transmission data by storing said plurality of transmission data; and
   second storage circuitry responsive to said plurality of outgoing control data by storing said plurality of outgoing control data.

3. The apparatus of claim 1, wherein said RF transmitter circuitry comprises:
   first signal conversion circuitry responsive to said at least one of said one or more transmitter baseband signals by providing a corresponding one or more analog baseband signals; and
   second signal conversion circuitry coupled to said first signal conversion circuitry and responsive to at least one of said one or more analog baseband signals by providing said at least one of said one or more RF output signals.

4. The apparatus of claim 1, wherein said RF transmitter circuitry comprises:
   digital-to-analog conversion circuitry responsive to said at least one of said one or more transmitter baseband signals by providing a corresponding one or more analog baseband signals; and
   quadrature modulation circuitry coupled to said digital-to-analog conversion circuitry and responsive to at least one of said one or more analog baseband signals by providing at least one quadrature-modulated signal as said at least one of said one or more RF output signals.

5. The apparatus of claim 1, wherein said RF receiver circuitry comprises:
   first signal conversion circuitry responsive to said at least one of said one or more RF input signals by providing a corresponding one or more analog baseband signals; and
   second signal conversion circuitry coupled to said first signal conversion circuitry and responsive to at least one of said one or more analog baseband signals by providing said one or more receiver baseband signals.

6. The apparatus of claim 1, wherein said RF receiver circuitry comprises:
   quadrature demodulation circuitry responsive to said at least one of said one or more RF input signals by providing at least one quadrature-demodulated signal; and
   analog-to-digital signal conversion circuitry coupled to said quadrature demodulation circuitry and responsive to said at least one quadrature-demodulated signal by providing at least one analog signal as said one or more receiver baseband signals.

7. The apparatus of claim 1, wherein said receiver baseband signal and control circuitry comprises:
   first storage circuitry responsive to said at least one of said one or more receiver baseband signals by storing said plurality of reception data; and
   second storage circuitry responsive to said at least one of said one or more incoming control signals by storing said plurality of incoming control data.

8. The apparatus of claim 1, wherein said at least one of said one or more outgoing control signals is substantially synchronous with said at least one of said one or more transmitter baseband signals.

9. The apparatus of claim 1, wherein at least a portion of said at least one of said one or more outgoing control signals is offset in time relative to at least a related portion of said at least one of said one or more transmitter baseband signals.

10. The apparatus of claim 1, wherein said at least one of said one or more outgoing control signals is indicative of one or more signal states of said at least one of said one or more transmitter baseband signals.

11. The apparatus of claim 1, further comprising at least one baseband signal communication path mutually coupling said transmitter baseband signal and control circuitry and said receiver baseband signal and control circuitry.

12. An apparatus including a radio frequency (RF) transceiver for providing substantially coincident communication of RF and related baseband control signals, comprising:
   an at least partial enclosure substantially defining a volume;
   a plurality of interface terminals substantially contained within said volume and including
      a plurality of RF terminals to convey one or more RF output signals to one or more destinations external to said volume, and to convey one or more RF input signals from one or more sources external to said volume, and
      a plurality of control terminals to convey one or more outgoing control signals to another one or more destinations external to said volume and to convey one or more incoming control signals from another one or more sources external to said volume;
   first storage circuitry substantially contained within said volume and responsive to a plurality of transmission data by storing said plurality of transmission data and providing one or more transmitter baseband signals;
   second storage circuitry substantially contained within said volume, coupled to at least one of said plurality of control terminals and responsive to a plurality of outgoing control data by storing said plurality of outgoing control data and providing said one or more outgoing control signals, wherein at least a portion of said outgoing control data is related to at least a portion of said plurality of transmission data;
   first signal conversion circuitry substantially contained within said volume, coupled to said first storage circuitry and responsive to at least one of said one or more transmitter baseband signals by providing a corresponding one or more outgoing analog baseband signals;
   second signal conversion circuitry substantially contained within said volume, coupled to said first signal conversion circuitry and at least one of said plurality of RF terminals, and responsive to at least one of said one or more outgoing analog baseband signals by providing said at least one of said one or more RF output signals, wherein said at least one of said one or more RF output signals corresponds to said at least one of said one or more transmitter baseband signals;
   third signal conversion circuitry substantially contained within said volume, coupled to at least one of said plurality of RF terminals and responsive to at least one of said one or more RF input signals by providing a corresponding one or more incoming analog baseband signals;
   fourth signal conversion circuitry substantially contained within said volume, coupled to said third signal conversion circuitry and responsive to at least one of said one or more incoming analog baseband signals by providing one or more receiver baseband signals;
   third storage circuitry substantially contained within said volume, coupled to said fourth signal conversion circuitry and responsive to at least one of said one or more receiver baseband signals by storing a plurality of reception data; and fourth storage circuitry substantially contained within said volume, coupled to at least one of said plurality of control terminals, and responsive to said at least one of said one or more incoming control signals by storing a plurality of incoming control data, wherein at least a portion of said plurality of incoming control data is related to at least a portion of said plurality of reception data.

13. The apparatus of claim 12, wherein:

said first signal conversion circuitry comprises digital-to-analog conversion circuitry responsive to said at least one of said one or more transmitter baseband signals by providing said corresponding one or more outgoing analog baseband signals; and said second signal conversion circuitry comprises quadrature modulation circuitry coupled to said digital-to-analog conversion circuitry and responsive to at least one of said one or more outgoing analog baseband signals by providing at least one quadrature-modulated signal as said at least one of said one or more RF output signals.

14. The apparatus of claim 12, wherein:

said third signal conversion circuitry comprises quadrature demodulation circuitry responsive to said at least one of said one or more RF input signals by providing at least one quadrature-demodulated signal as said corresponding one or more incoming analog baseband signals; and said fourth signal conversion circuitry comprises analog-to-digital signal conversion circuitry coupled to said quadrature demodulation circuitry and responsive to said at least one quadrature-demodulated signal by providing at least one analog signal as said one or more receiver baseband signals.

15. The apparatus of claim 12, wherein said at least one of said one or more outgoing control signals is substantially synchronous with said at least one of said one or more transmitter baseband signals.

16. The apparatus of claim 12, wherein at least a portion of said at least one of said one or more outgoing control signals is offset in time relative to at least a related portion of said at least one of said one or more transmitter baseband signals.

17. The apparatus of claim 12, wherein said at least one of said one or more outgoing control signals is indicative of one or more signal states of said at least one of said one or more transmitter baseband signals.

18. The apparatus of claim 12, further comprising at least one baseband signal communication path mutually coupling said second storage circuitry and said fourth storage circuitry.

19. An apparatus including a radio frequency (RF) transceiver for providing substantially coincident communication of RF and related baseband control signals, comprising:

enclosure means for substantially defining a volume;

interface means, substantially contained within said volume, for conveying one or more RF output signals and one or more outgoing control signals to one or more destinations external to said volume, and for conveying one or more RF input signals and one or more incoming control signals from one or more sources external to said volume;

transmitter baseband signal and control means, substantially contained within said volume, for responding to a plurality of transmission data and a plurality of outgoing control data by generating one or more transmitter baseband signals and said one or more outgoing control signals, wherein at least a portion of said outgoing control data is related to at least a portion of said plurality of transmission data;

RF transmitter means, substantially contained within said volume, for responding to at least one of said one or more transmitter baseband signals by generating at least one of said one or more RF output signals, wherein said at least one of said one or more RF output signals corresponds to said at least one of said one or more transmitter baseband signals;

RF receiver means, substantially contained within said volume, for responding to at least one of said one or more RF input signals by generating one or more receiver baseband signals; and receiver baseband signal and control means, substantially contained within said volume, for responding to at least one of said one or more receiver baseband signals and at least one of said one or more incoming control signals by generating a plurality of reception data and a plurality of incoming control data, wherein at least a portion of said incoming control data is related to at least a portion of said plurality of reception data.

20. An apparatus including a radio frequency (RF) transceiver for providing substantially coincident communication of RF and related baseband control signals, comprising:

enclosure means for substantially defining a volume;

interface means, substantially contained within said volume, for conveying one or more RF output signals and one or more outgoing control signals to one or more destinations external to said volume, and for conveying one or more RF input signals and one or more incoming control signals from one or more sources external to said volume;

first storage means, substantially contained within said volume, for responding to a plurality of transmission data by storing said plurality of transmission data and generating one or more transmitter baseband signals;

second storage means, substantially contained within said volume, for responding to a plurality of outgoing control data by storing said plurality of outgoing control data and generating said one or more outgoing control signals, wherein at least a portion of said outgoing control data is related to at least a portion of said plurality of transmission data;

first signal converter means, substantially contained within said volume, for responding to at least one of said one or more transmitter baseband signals by generating a corresponding one or more outgoing analog baseband signals;

second signal converter means, substantially contained within said volume, for responding to at least one of said one or more outgoing analog baseband signals by generating said at least one of said one or more RF output signals, wherein said at least one of said one or more RF output signals corresponds to said at least one of said one or more transmitter baseband signals;

third signal converter means, substantially contained within said volume, for responding to at least one of said one or more RF input signals by generating a corresponding one or more incoming analog baseband signals;

fourth signal converter means, substantially contained within said volume, for responding to at least one of said one or more incoming analog baseband signals by generating one or more receiver baseband signals;

third storage means, substantially contained within said volume, for responding to at least one of said one or more receiver baseband signals by storing a plurality of reception data; and fourth storage means, substantially contained within said volume, for responding to said at least one of said one or more incoming control signals by storing a plurality of incoming control data, wherein at least a portion of said plurality of incoming control data is related to at least a portion of said plurality of reception data.

* * * * *